United States Patent
Amschler et al.

(10) Patent No.: US 8,239,689 B2
(45) Date of Patent: Aug. 7, 2012

(54) DEVICE AND METHOD FOR A SECURE EXECUTION OF A PROGRAM

(75) Inventors: Harald Amschler, Bobingen (DE); Berndt Gammel, Markt Schwaben (DE)

(73) Assignee: Infineon Technologies AG (DE)

( * ) Notice: Subject to any disclaimer, the term of this patent is extended or adjusted under 35 U.S.C. 154(b) by 1057 days.

(21) Appl. No.: 11/368,016

(22) Filed: Mar. 2, 2006

(65) Prior Publication Data

US 2008/0022130 A1    Jan. 24, 2008

Related U.S. Application Data

(63) Continuation of application No. PCT/EP2004/009498, filed on Aug. 25, 2004.

(30) Foreign Application Priority Data

Sep. 2, 2003  (DE) ................................. 103 40 411

(51) Int. Cl.
    *G06F 21/00* (2006.01)
(52) U.S. Cl. ...................... 713/190; 713/194; 713/187
(58) Field of Classification Search .................. 713/190, 713/194, 164, 167, 187; 235/380; 711/163–164, 711/168, 167; 714/11
    See application file for complete search history.

(56) References Cited

U.S. PATENT DOCUMENTS

| | | | |
|---|---|---|---|
| 5,018,146 A | 5/1991 | Sexton | |
| 5,651,123 A * | 7/1997 | Nakagawa et al. | 712/208 |
| 5,675,645 A * | 10/1997 | Schwartz et al. | 713/187 |
| 5,696,828 A * | 12/1997 | Koopman, Jr. | 380/46 |
| 5,856,659 A * | 1/1999 | Drupsteen et al. | 235/380 |
| 6,006,328 A | 12/1999 | Drake | |
| 6,490,720 B1 | 12/2002 | Carlsen et al. | |
| 6,507,808 B1 | 1/2003 | LaFauci | |
| 7,086,088 B2 * | 8/2006 | Narayanan | 726/22 |
| 7,168,065 B1 | 1/2007 | Naccache et al. | |
| 7,581,103 B2 * | 8/2009 | Home et al. | 713/176 |
| 2003/0131210 A1 | 7/2003 | Mueller | |
| 2003/0163431 A1* | 8/2003 | Ginter et al. | 705/64 |
| 2003/0200448 A1* | 10/2003 | Foster et al. | 713/189 |
| 2004/0034823 A1* | 2/2004 | Watkins et al. | 714/724 |

(Continued)

FOREIGN PATENT DOCUMENTS

DE    100 02 204 A1   7/2001

(Continued)

OTHER PUBLICATIONS

Verlag TUV Bayern, et al., "Microcomputers in Safety Technique," TUV Study Group on Computer Safety, 1986, Germany, 7-91, 7-92, 8-4 and 8-6.

(Continued)

*Primary Examiner* — Edward Zee
*Assistant Examiner* — Chi Nguy
(74) *Attorney, Agent, or Firm* — Dickstein Shapiro LLP

(57) ABSTRACT

A device and method for a secure execution of a program. The program includes a sequence of program commands including use and checking commands. A checking value is generated according to a setup regulation when executing a checking command. A control value is generated according to the setup regulation and the checking value is compared to the control value. An insecure execution of the program is indicated when the checking value and the control value do not match.

21 Claims, 4 Drawing Sheets

U.S. PATENT DOCUMENTS

| | | | | |
|---|---|---|---|---|
| 2004/0123116 | A1* | 6/2004 | Jin et al. | 713/187 |
| 2004/0123132 | A1* | 6/2004 | Montgomery et al. | 713/200 |
| 2004/0201406 | A1* | 10/2004 | Lee et al. | 327/158 |

FOREIGN PATENT DOCUMENTS

| | | |
|---|---|---|
| DE | 101 31 577 A1 | 1/2003 |
| EP | 1 305 708 B1 | 6/2003 |
| FR | 2 790 844 A1 | 9/2000 |

OTHER PUBLICATIONS

Karl Kollmann, "Chipkarten and Verbraucher," Jun. 1996, Austrian Smart Card Association, pp. 1-20.

AG Chip Cards with AK Technology of the Conference of Federal and State Data Protection Commissioners, The Bavarian Commissioner for Data Protection, Feb. 1996.

Ramamoorthy, C.V. et al.; "Reliability and integrity of large computer programs"; GFK-GI-GMR Fachtagung Prozessrechner 1974, Springer Verlag, Berlin/ Heidelberg, p. 147-152.

Keim, G.; "Die Erhoehung der Sicherheit von Mikrocomputersystemen"; Angewandte Informatik Journal issued by University Trier; vol. 22, No. 2, 1980. (English title is "Increasing the Security of Microcomputer Systems").

H. Hoelscher et al.; "Microcomputers in Safety Technique"; TUV Study Group on Computer Safety—Verlag TUV Bayern, Munich: Verlag TUV Rheinland, 1986, Germany, pp. 7-86-7-92.

\* cited by examiner

DEVICE AND METHOD FOR A SECURE EXECUTION OF A PROGRAM

CROSS-REFERENCE TO RELATED APPLICATION

This application is a continuation of copending International Application No. PCT/EP04/009498, filed Aug. 25, 2004, which designated the United States and was not published in English, and is incorporated herein by reference in its entirety.

BACKGROUND OF THE INVENTION

1. Field of the Invention

The present invention relates to a device and a method for a secure execution of a program and, in particular, to a device and a method for executing a program having checking commands enabling a control of the program execution.

2. Description of Related Art

Chip cards have a wide continuously extending spectrum of use. Frequently, they contain trusted information. Examples are payment and credit cards, insurance cards or access control cards. The area of use and the acceptances of such chip cards substantially depend on their security features. The trusted data contained on the chip cards have to be protected from being read out by unauthorized persons.

Chip cards usually comprise a chip card controller on which a software program is executed. In an activation, the program usually executes authentication processes protecting the chip card from being accessed by unauthorized persons. If an attacker succeeds in skipping the authentication process, then he obtains authorized access to the data stored on the chip card and to functions controlled by the chip card. In order to skip the authentication process or another process, the course of the program execution is interfered with by the attacker by invasive attacks. One possible invasive attack is the provision of an interference pulse to a voltage supply of a chip card. This has the consequence that a program command counter of the chip card controller is changed in an unspecified way not planned by the designer. A change of the command counter caused by an attacker causes a change of the program course, as the chip card controller continues executing the program after the attack at a location predetermined by the changed command counter. This way it is possible to determinedly skip individual program sections, like for example an authentication process, and provide a side entry into a program section which is originally protected by the authentication process.

Conventionally used programs and chip card controllers for executing such programs already include a series of features offering protection from an attack targeting to an interference with the program course.

Conventional program courses contain mutual dependencies of different program sections offering a protection from changes of the program course. For example, program initializations or program results are needed in later program sections and an incorrect presence of such values would lead to a program breakdown. Such dependencies have the disadvantage, however, that they are not equally distributed across a program course. In order to effectively protect a program course against attacks, thus additional artificial dependency constructions are required in the program course. However, such dependencies as a protection of a program course are not supported by the conventional programs for generating a software. This makes program changes difficult, as the dependencies between individual program parts which are necessary as a protection have to be manually inserted and checked.

Frequently, the time period a program needs for initializing is checked and secured by a monitoring circuit ("watch dog"). Such a solution is not flexible enough, however, to adapt to different time periods of the initialization course, and offers no protection against changes in the control course during the setup procedure. Only the execution of the terminal portion of the initialization is protected this way. A further disadvantage is that a monitoring solution based on a temporal monitoring may hardly be checked during the manufacturing test of a device. A further disadvantage is that the timer of the monitoring circuit is not necessarily resistant enough in order to not be influenced by the interference pulse as well.

A further possibility for a protection against interference pulses provided onto the voltage supply is to integrate an interference pulse sensor into a chip card. The interference pulse sensor should detect attacks from the fact that a voltage peak is located outside the specified operation conditions. The main problem of such an approach is that the sensor has to be set exactly to the limiting values of the operating conditions. This again means that the operating conditions of the circuit to be protected have to be characterized very precisely in order to prevent a security hole. Both the setting of the sensor and the exact characterizing of the circuit are very time consuming and costly.

In EP 1 305 708 B1, a method is presented enabling a correct temporal course of code blocks of a computer program in a multi processor system. Here, the multi processor system includes a computer and a manipulation-secure device connected to the computer. The computer program is performed on the computer. The code blocks, however, are performed as sub-programs within the manipulation-secure device. A temporally correct course of the code blocks is guaranteed by the fact that the code blocks include sequence data identifying the respective code block and indicating which code blocks are to be executed before or after the code block, respectively. The manipulation-secure device is implemented to determine in response to the sequence data whether a code block may be performed. This approach requires a high expense regarding both software and hardware, as the sequence data may conventionally not automatically be established and integrated into the code blocks and as a second processor is required on which the secured code blocks are executed.

US 2003/0131210 describes a possibility for checking security values of an EEPROM. It is assumed that with a change of EEPROM contents due to an attack also the contents of the EEPROM backups are changed. During the reset phase, a boot sequence is executed reading out the backups. The boot sequence is a program enabling a computer or controller to perform an automatic checking of the backups. The read-out backup values may be accumulated and compared to a reference value for example in the form of a signature register or a further backup value.

U.S. Pat. No. 5,018,146 describes a system for checking a plug-in card of a processor system. The plug-in card includes a memory in which a first error checking word and starting parameter data words are arranged. After the plug-in process, the first error checking word and the starting parameter data words are read out. From the starting parameter data words using a predetermined algorithm a further error checking word is formed and compared to the first error checking word. If the first and the second error checking words do not match, the card is not allowed a further operation in the system.

SUMMARY

It is an object of the present invention to provide a device and a method for a secure execution of a program enabling a protection of the program execution, which is flexible, simple, cost-effective to be realized and effective.

In accordance with a first aspect of the present invention, a device is configured for a secure execution of a program including a sequence of program commands. The program commands include commands of use and checking commands, wherein the checking commands are arranged between the commands of use so that according to a specified execution path of the program a sequence of executing the checking commands is specified. The device includes a processor for executing the sequence of program commands, wherein the processor for executing is implemented to generate a checking value when executing a checking command according to a setup regulation. In addition, the device has a provider for separately providing a control value, wherein the control value is derived from a preceding control value according to the setup regulation. Further, a comparator is provided for comparing the checking value to the control value; and the device also includes a provider for providing an indication to an interference with the execution of the specified execution path of the program when the checking value and the control value do not match.

In accordance with a second aspect of the present invention, a method is configured for a secure execution of a program including a sequence of program commands, wherein the program commands include commands of use and checking commands, wherein the checking commands are arranged between the commands of use, so that according to a specified execution path of the program a sequence of the execution of the checking commands is specified. The method includes the steps of executing the sequence of program commands, wherein when executing a checking command a checking value is generated according to a setup regulation; separately providing a control value, wherein the control value is derived from a preceding control value according to the setup regulation; comparing the checking value to the control value; and providing an indication to an interference with the execution of the specified execution path of the program when the checking value and the control value do not match.

In accordance with a third aspect, the present invention provides a computer program having a program code for performing the above-mentioned method, when the computer program runs on a computer.

According to the present invention, a program including a sequence of program commands consisting of commands of use (or use commands) and checking commands is executed on a means for executing the program commands. The means for executing the program commands is implemented to generate a checking value according to a setup regulation when executing the checking command. In a means for generating a control value, a control value is generated according to the setup regulation and compared to the checking value in a means for comparing. When the control value and the checking value do not match, by a means for providing an indication an indication to a non-secure execution of the program is provided.

The special advantage of the inventive approach is its great flexibility. A secure execution of a program is guaranteed independent of temporal conditions. This is important, as configurations and execution forms used in different product derivations lead to substantial deviations in the temporal course of a program flow. Further, hardware processes executed in parallel to processes running on a main computer, further conventionally include a clocking deviating from the main computer.

A further advantage is that the frequency of checking commands in an executable program may be freely selected and thus may be flexibly adapted to critical program sections and to future requirements.

A further advantage is the cost-effective and simple realization of the present invention. The checking commands inserted into the program course cause virtually costs with regard to the program size and the performance of the software. If the means for generating a control value, the means for comparing and the means for providing an indication are implemented in hardware, then the area consumption necessary for this purpose may be kept at a minimum on a silicon chip. A further cost reduction is that certification processes and security tests are simplified, as the execution of a specified execution path of a program is forced by the arrangement of checking commands. The arrangement of checking commands is here directly derived from state diagrams and may in a simple way be checked against a documentation.

A special advantage is the high security which the invention provides against invasive attacks. Sensitive program sections are interspersed with checking commands and are thus secured from a side entry caused by an invasive attack. Different execution paths may be adequately protected against side entries. Further, insecure infinite loops are excluded, as when executing a subsequent checking command, an alarm is automatically triggered if necessary.

A further advantage of the present invention is that the inventive approach is independent of the system and protects both programs in a operating system layer and also application software.

BRIEF DESCRIPTION OF THE DRAWINGS

Preferred embodiments of the present invention will be detailed subsequently referring to the appended drawings, in which.

DESCRIPTION OF THE PREFERRED EMBODIMENTS

Figure 1:
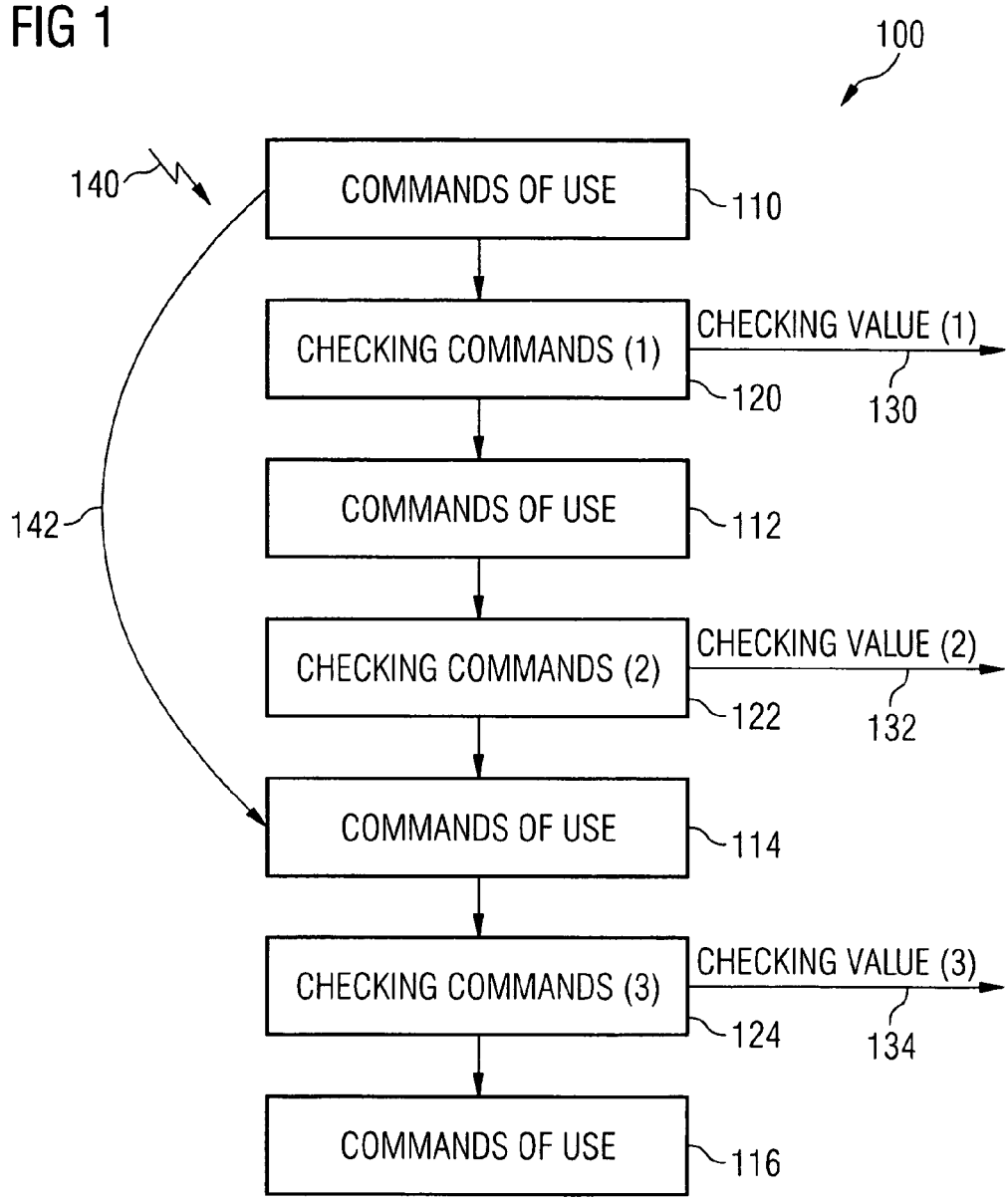
FIG. 1 shows a schematical illustration of an execution of a program according to the present invention.

FIG. 1 is the temporal course of an execution of a program in a device for a secure execution of a program. Further, an interference with the program execution is shown, caused by an attack on the device for a secure execution of a program.

The program includes a sequence 100 of program commands performed consecutively in time in a means for executing the commands (not shown). The sequence 100 of program commands here includes commands of use 110, 112, 114, 116 and checking commands 120, 122, 124. The commands of use 110, 112, 114, 116 respectively contain a single one or a plurality of application-specific instructions. In the present embodiment, the commands of use 110 contain instructions for a system initialization and a user authentication. The commands of use 112, 114, 116 contain security-relevant instructions for encoding or for managing trusted data. In order to guarantee a secure execution of the commands of use 110, 112, 114, 116, between the commands of use 110, 112, 114, 116 checking commands 120, 122, 124 are arranged. After an execution of the commands of use 110, the first checking command 120 is performed. Subsequently, the commands of use 112 are performed and again subsequently the second checking command 122 is performed. Accordingly, subsequently the commands of use 114, the third checking command 124 and the commands of use 116 are executed.

The sequence 100 of program commands is executed in a means for executing the program commands. The means for executing the program commands is implemented to generate checking values 130, 132, 134 in response to the checking commands 120, 122, 124. When executing the first checking command 120, a first checking value 130 is generated. Accordingly, when executing the checking command 122 a second checking value 132 and when executing the third checking command 124 a third checking value 134 are generated. The generation of the checking values 130, 132, 134 takes place according to a setup regulation.

According to the present invention, the checking values 130, 132, 134 are compared to separately provided control values (not shown) concurrently to the program execution. When a checking value 130, 132, 134 and a control value do not match, an indication (not shown) to an insecure execution of the program is provided.

If an attacker provides an interference pulse 140 to a voltage supply (not shown) of the means for executing the program command, then a command counter responsible for the program course may be changed. In this embodiment, the interference pulse 140 occurs during an instruction of the commands of use 110, which are performed by a user authentication requesting the input of a secret number or PIN by a user. In this embodiment, the interference pulse 140 triggered a leap 142 in the sequence of program commands, caused by a change of the command counter. As a consequence, the command counter now points to the commands of use 114. The attacker was therefore successful in skipping the authentication process and reaching a section of the program via a side entry, which allows an access to security-critical data.

From FIG. 1 it may be seen that the security-relevant commands of use 112, 114, 116 are more frequently interrupted by checking commands 122, 124 than non-security-relevant commands of use 110 which are required for a program initialization. The frequent arrangement of checking commands 122, 124 between security-relevant commands of use 112, 114, 116 guarantees that after a side entry into the security-relevant commands of use 112, 114, 116 by an interference pulse 140, already after the execution of some few security-relevant instructions a checking command 122, 124 is performed and thus the side entry is detected. The checking commands 120, 122, 124 are preferably interspersed into the commands of use 110, 112, 114, 116 so that an attacker, after the interference of the program course by the interference pulse 140, is not able to read out security-relevant information or even control the further program course.

By changing 142 the command counter, the first checking command 120 and the second checking command 122 are skipped. Instead of the first checking value 130, after the leap 142 in the sequence of the program commands the third checking value 134 is generated. As the checking values 130, 132, 134 are compared to control values according to the present invention, the change 142 of the command counter caused by the interference pulse 140 is detected as soon as the checking command 124 is performed, and consequently instead of the anticipated first checking value 130 the third checking value 134 is generated and compared to the separately generated control value.

If the checking values 130, 132, 134 are already known when establishing the sequence 100 of program commands, they may be firmly inserted into the checking commands 120, 122, 124. The first checking command 120 then receives the instruction "output: value 1", the second checking command 122 receives the instruction "output: value 2" and the third checking command 124 receives the instruction "output: value 3". Alternatively, the checking values 130, 132, 134 may also be stored in a table, and the checking values 120, 122, 124 respectively contain the instruction to read out a corresponding checking value from the table and to output the same. A greater flexibility is achieved by generating the checking values 130, 132, 134 only during the execution of the sequence 100 of program commands. In this case, the checking commands 120, 122, 124 branch to a subroutine which establishes the checking values 130, 132, 134 according to the setup regulation and outputs the same. With increased security requirements, according to the setup regulation, the subroutine includes a pseudo random generator. Based on an initialization value, subsequent checking values are generated as a pseudo random number sequence.

A great number of different checking values 130, 132, 134 increases the protection against a leap 142 in the sequence of the program commands, as there is only a low probability that the checking value 134 provided after the leap 142 matches the anticipated checking value 130.

Figure 2:
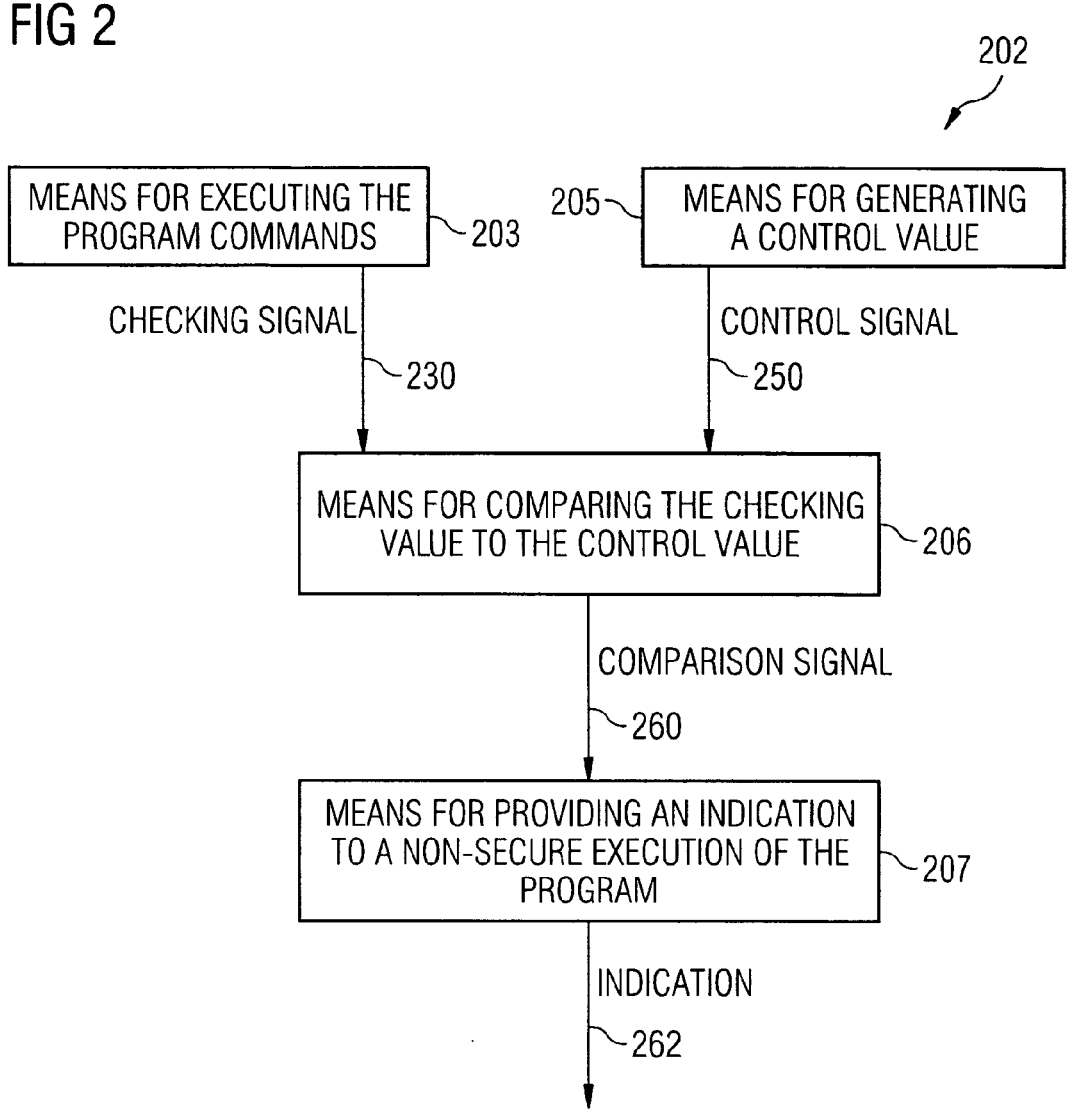
FIG. 2 shows a device for a secure execution of a program according to the present invention.

FIG. 2 shows a block diagram of a device 202 for the secure execution of a program. The device 202 for the secure execution of a program includes a means for executing the program commands 203, a means for generating a control value 205, a means for comparing the checking value to the control value 206, and a means for providing an indication to a insecure execution of the program 207. The means 206 for comparing the checking value to the control value is connected to the means 203 for executing the program commands via a checking signal 230 and to the means 205 for generating a control value via a control value signal 250.

The means 203 for executing the program commands provides a checking value via the checking signal 230, and the means 205 for generating a control value provides a control value via the control value signal 250 to the means 206 for comparing the checking value to the control value. The means 206 for comparing the checking value to the control value is implemented to compare the checking value to the control value. The means 206 for comparing the checking value to the control value is connected to the means 207 for providing an indication to an insecure execution of the program via a comparison signal 260. In response to the comparison signal 260 containing information about the comparison performed within the means 206 for comparing the checking value to the control value, the means 207 for providing an indication to an insecure execution of the program provides an indication 262.

The means 203 for executing the program commands performs a sequence of program commands containing both commands of use and checking commands, as shown in FIG. 1. When executing a checking command, the means 203 for executing the program commands provides a checking value via the checking signal 230. The checking value is generated according to a setup regulation. The setup regulation is known in the means 205 for generating a control value.

The means 205 for generating a control value is coupled to the means 203 for executing the program commands or to the means 206 for comparing a checking value to the control value in a way (not shown) so that it generates a control value in response to the provision of the checking value according to the setup regulation. The coupling may be performed by an additional signal or by a connection to the checking value 230. Based on a common initialization value after an initialization of the device 202 for a secure execution of a program, the means 203 for executing the program commands generates consecutive checking values 230 in response to the checking commands, and the means 205 for generating a control value generates control values according to the same setup regulation in response to the checking values 230.

In an uninterrupted program course in the means 203 for executing the program commands each generated checking value corresponds to a corresponding concurrently generated control value. If, however, as described in FIG. 1, a single checking command or several checking commands are skipped when executing the sequence of program commands, then a subsequently generated checking value does not match the concurrently generated control value. In this error case, the means 207 for providing an indication to an insecure execution of the program is notified about a mismatch of the checking value and the control value by the means 206 for comparing the checking value to the control value via the comparison signal 260. In this case, the means 207 for providing an indication to an insecure execution of the program provides an error indication 262.

Figure 3:
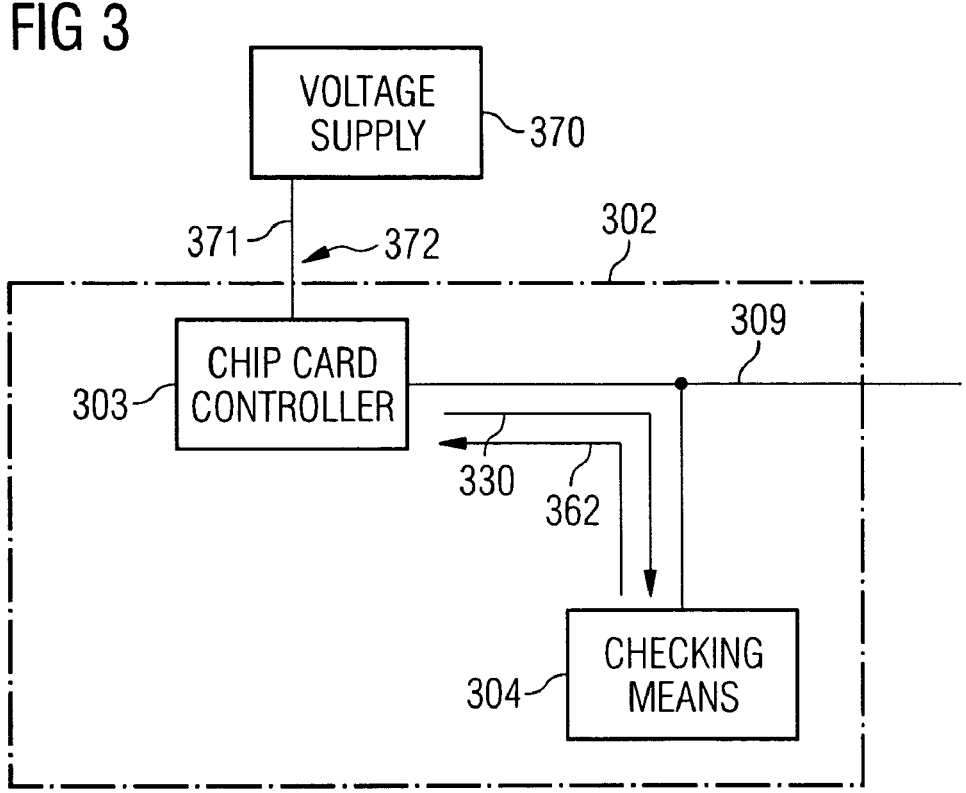
FIG. 3 shows a block diagram of a device for a secure execution of a program according to a preferred embodiment.

FIG. 3 shows a further preferred embodiment of a device 302 for a secure execution of a program. The device 302 for a secure execution of a program includes a means for executing the program commands in the form of a chip card controller 303 and a checking means 304 which is implemented as a peripheral device and connected to the chip card controller 303 via a chip card bus 309. The checking means 304 includes the means shown in FIG. 2, a means for generating a control value, a means for comparing the checking value to the control value, and a means for providing an indication to an insecure execution of the program (the latter means are not shown in FIG. 3).

The chip card controller 303 may be connected to further peripheral devices (not shown) via the bus 309. The chip card controller 303 performs a program which includes commands of use and checking commands according to FIG. 1. When performing a checking command, the chip card controller 303 generates a checking value 330 according to a setup regulation. The chip card controller 303 is implemented to write the generated checking value 330 into checking means 304 via the bus 309. In response to the checking value 330, the checking means generates a control value corresponding to the checking value according to the setup regulation. Alternatively, the corresponding control value may already have been generated in response to a preceding checking value and may have been stored up to the arrival of the subsequent checking value 330. This results in a time saving as the corresponding control value is already present when the checking value 330 arrives. Subsequently, the checking value 330 is compared to the control value. When the checking value 330 and the control value generated in the checking means do not match, an error indication 362 is generated which is transmitted to the chip card controller 303 via the bus 309. In this embodiment, the error indication 362 is an instruction, which sets the chip card controller into a secure state, a so-called "halt" state.

With reference to FIG. 3, additionally a possible invasive attack to the chip card controller is illustrated, which results in an interference with the program course, as indicted in FIG. 1. The chip card controller 303 is connected to a voltage supply 370. Via a line 371 the voltage supply 370 provides the chip card controller with an operating voltage which lies within a specified voltage range. If an attacker provides an interference pulse 372 to line 371, then the specified operating voltage range is left temporarily. As a consequence, the program course may be interfered with, as described in FIG. 1, and the attacker may obtain access to protected program sections. According to the invention, a leap in the program course caused by the interference is detected, as a checking value 330 which is transmitted after the attack does not match the correspondingly generated control value, and the chip card controller is subsequently set into a "halt" state by the checking means 304. In this state, a further execution of the program by the attacker is not possible any more.

Preferably, the checking means 304 is implemented so that it is not influenced by an attack on the device for a secure execution of a program, or it is implemented so that the control value is set to a secure value after an interference which is different from a possible checking value.

Figure 4:
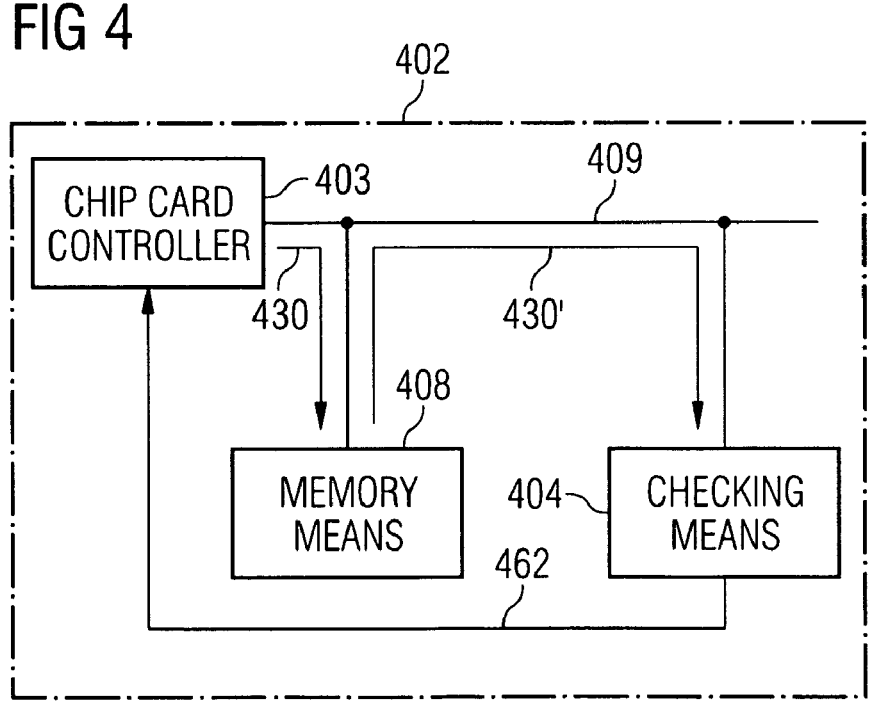
FIG. 4 shows a block diagram of a device for a secure execution of a program according to a further preferred embodiment.

FIG. 4 shows a further preferred embodiment of a device 402 for a secure execution of a program. According to FIG. 3, the device 402 for a secure execution of a program includes a chip card controller 403 and a checking means 404. Additionally, a memory means 408 is shown which is connected to the chip card controller 403 and the checking means 404 via the bus 409. In this embodiment, the chip card controller 403 is implemented to write a checking value 430 into the memory means 408 when executing a checking command. According to this, the checking means 404 is implemented to read out a checking value 430' corresponding to the checking value 430 from the memory means 408. As the checking means 404 is connected to the chip card controller 403 via the bus 409, the checking means 404 detects a write in which a new checking value 430 is written into the memory means. The checking means 404 is again implemented to set up a control value corresponding to the checking value 430' according to the setup regulation and to check the control value with the checking value 430'. When the control value and the checking value 430' do not match, the checking means 404 again provides an error indication which is in this embodiment reported to the chip card controller via an additional error signal 462. The chip card controller 403 is implemented to set itself into a secure state in response to the error signal 462.

In this embodiment, consecutive checking values are different and are written into a memory location of the memory means 408 known to the checking means. Alternatively, consecutive checking values may also be written to different memory locations of the memory means 408. Information about the memory location into which the checking value 430 is written or from which the checking value 430' is read, respectively, is in this case also contained within the setup regulation and know both to the chip card controller 403 and to the checking means 404. In this case, consecutive checking values are already different due to the respectively different memory location in the memory means 408. If consecutive checking values additionally include different values, then security is increased. In contrast to pre-ceding embodiments, in this embodiment consecutive checking values may also be the same value.

Figure 5:
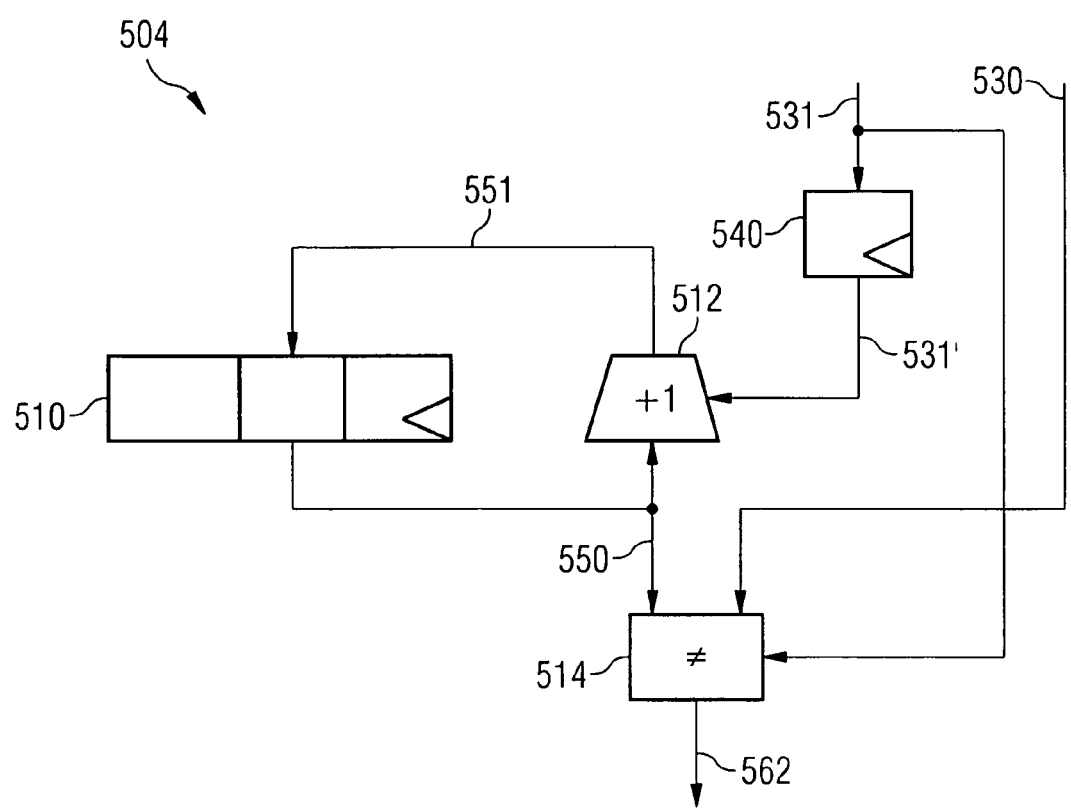
FIG. 5 shows a block diagram of a means for generating a control value and a means for comparing the checking value to the control value according to a preferred embodiment of the present invention.

FIG. 5 shows an embodiment of a checking means 504 corresponding to a checking means according to FIG. 3. The checking means 504 includes a register 510 in the form of a 3-bit register, an upcounter 512, and a comparison means 514. The comparison means 514 is implemented as a hardware comparator. The checking means 504 is connected to a chip card controller (not shown) via a bus. Of the bus signals one data signal 530 and one control signal 531 are shown. The data signal 530 is connected to the comparison means 514 and provides a checking value generated by the chip card controller to the comparison means 514. A write of a checking value from the chip card controller to the checking means 504 is indicated by the control signal 531. The control signal 531 is connected both to the comparison means 514 and also to a shift register 540. In response to an active control signal 531, the comparison means 514 compares the checking value provide by the data signal 530 to a control value 550 stored in the register 510. The control value 550 is additionally supplied to the forward counter 512. In response to a control signal 531' delayed by the shift register 540, the up-counter increases the control value 550 by 1 and writes the newly generated control value 551 into the register 510. In this embodiment, the setup regulation says that a subsequent control value 551 is generated from a preceding control value 550 by incrementing the preceding control value 550 by 1. During an initialization of the checking means, the register 510 is set to a defined value. In this embodiment, the register 510 is set to the value 0 during the initialization. In response to the control signal 531 indicating the presence of a valid checking value on the data signal 530, the checking value is compared to the control value 550 in the comparison means 514. Based on the performed comparison, an indication signal 562 is provided. Via the indication signal 562 an alarm is triggered when the checking value and the control value do not match.

According to a further embodiment, a setup regulation includes the use of a pseudo random number generator. Such a pseudo random number generator is implemented in a checking means in the form of a linear feedback register. Alternatively, also a different cryptographic method may be used offering an increased security. The use of a pseudo random number generator increases security if a very high number of checking values is required.

Alternatively, checking means may be implemented as a crypto coprocessor.

Although above preferred embodiments of the present invention were discussed in detail, it is obvious that the present invention is not limited to those embodiments. In particular, the present invention is also applied to other data processing systems on which a program is performed whose secure execution is to be guaranteed. The inventive approach may also advantageously be used for security-relevant programs, as it does not only provide protection against attacks which aim at interfering with the program execution, but also a protection against interferences caused by environmental influences or system-conditioned malfunctions.

Depending on the conditions, the inventive method for a secure execution of a program may be implemented in hardware or in software. The implementation may be performed on a digital storage medium, in particular a floppy disk or a CD having electronically readable control signals, which may cooperate with a programmable computer system so that the corresponding method is performed. In general, the invention thus also consists in a computer program product having a program code stored on a machine-readable carrier for performing the inventive method when the computer program product runs on a computer. In other words, the invention may be realized as a computer program having a program code for performing the method when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A device for a secure execution of a program including a sequence of program commands, wherein the program commands include commands of use and checking commands, wherein the checking commands are arranged between the commands of use, so that according to a specified execution path of the program a sequence of executing the checking commands is specified, comprising:
   a processor configured to execute the sequence of program commands, wherein the processor is implemented to provide a checking value generated according to a setup regulation when executing a checking command and not to provide a corresponding checking value when executing a command of use;
   a provider configured to separately generate a control value concurrently to the execution of the program, wherein the control value is derived from a preceding control value according to the setup regulation;
   a comparator configured to compare the checking value to the control value concurrently to the execution of the program; and
   a provider configured to provide an indication to an interference with the execution of the specified execution path of the program when the checking value and the control value do not match,
   wherein the providers and the comparator are implemented in hardware separate from the processor.

2. The device for a secure execution of a program according to claim 1, wherein a generator is implemented to generate, in response to a checking value, a next control value which is derived from a preceding control value according to the setup regulation.

3. The device for a secure execution of a program according to claim 1, wherein the processor is implemented to enter a security state in response to an indication to an insecure execution of the program.

4. The device for a secure execution of a program according to claim 1, wherein the processor is a chip card controller which is connected to a checker comprising a generator configured to generate a control value, a comparator configured to compare the checking value to the control value, and a provider configured to provide an indication of an insecure execution of the program.

5. The device for a secure execution of a program according to claim 4, wherein the checker is a crypto coprocessor.

6. The device for a secure execution of a program according to claim 1, wherein the device for a secure execution of a program comprises a bus and a memory, and wherein the processor, the comparator, and the memory are coupled to the bus; and
   wherein the processor is implemented to provide a checking value according to a setup regulation in the memory, and wherein the comparator is implemented to read out a checking value according to the setup regulation from the memory.

7. The device for a secure execution of a program according to claim 1, wherein a generator configured to generate the control value comprises a register and a forward counter, to increment a preceding control value in response to a checking value, to generate a subsequent control value.

8. The device for a secure execution of a program according to claim 1, wherein a generator configured to generate the control value comprises a pseudo random number generator which generates a subsequent control value from a preceding control value in response to a checking value.

9. The device for a secure execution of a program according to claim 8, wherein the pseudo random number generator is a linear feedback register.

10. The device for a secure execution of a program according to claim 1, wherein the comparator is implemented as a hardware comparator.

11. The device for a secure execution of a program according to claim 1, wherein the provider configured to separately generate a control value is configured to, in response to a preceding checking value, generate and store in advance a control value to be compared to a subsequently received checking value.

12. The device for a secure execution of a program according to claim 11, wherein the provider configured to generate the control value comprises a shift register, a forward counter and a register for storing the control value,
wherein the comparator is configured to compare the control value stored in the register to the checking value upon receipt of a control signal, wherein the shift register is configured to delay the control signal, and wherein the forward counter is configured to receive the delayed control signal, to increase the control value and to write the increased control value into the register.

13. A method for a secure execution of a program including a sequence of program commands, wherein the program commands include commands of use and checking commands, wherein the checking commands are arranged between the commands of use, so that according to a specified execution path of the program a sequence of the execution of the checking commands is specified, the method comprising:
a) executing the sequence of program commands, wherein when executing a checking command a checking value generated according to a setup regulation is provided and when executing a command of use a corresponding checking value is not provided;
b) separately generating a control value concurrently to the execution of the program, wherein the control value is derived from a preceding control value according to the setup regulation;
c) comparing the checking value to the control value concurrently to the execution of the program; and
d) providing an indication to an interference with the execution of the specified execution path of the program when the checking value and the control value do not match,
wherein generating the control value, comparing the checking value to the control value and providing an indication are performed by hardware separate from the processor.

14. The method according to claim 13, wherein the step of providing a control value is performed by a generator that generates the control value and is implemented to generate, in response to a checking value, a next control value which is derived from a preceding control value according to the setup regulation.

15. The method according to claim 13, wherein the step of executing the sequence of program commands is performed by a processor that is implemented to enter a security state in response to an indication to an insecure execution of the program.

16. The method according to claim 13, wherein the program commands are executed by a processor in the form of a chip card controller which is connected to a checker comprising a generator configured to generate the control value, a comparator configured to compare the checking value to the control value, and a provider configured to provide an indication of an insecure execution of the program.

17. The method according to claim 13, wherein generating the control value comprises, in response to a preceding checking value, generating and storing in advance a control value to be compared to a subsequently received checking value.

18. The method according to claim 17, wherein generating the control value is performed using a shift register, a forward counter and a register for storing the control value,
wherein the comparator is configured to compare the control value stored in the register to the checking value upon receipt of a control signal, wherein the shift register is configured to delay the control signal, and wherein the forward counter is configured to receive the delayed control signal, to increase the control value and to write the increased control value into the register.

19. A non-transitory machine-readable carrier having stored thereon a program code for performing a method for a secure execution of a program including a sequence of program commands, when the computer program runs on a computer, wherein the program commands include commands of use and checking commands, wherein the checking commands are arranged between the commands of use, so that according to a specified execution path of the program a sequence of the execution of the checking commands is specified, the program being configured to:
a) execute the sequence of program commands, wherein when executing a checking command a checking value generated according to a setup regulation is provided concurrently to the execution of the program and when executing a command of use a corresponding checking value is not provided;
b) separately generate a control value in response to the provision of the checking value, wherein the control value is derived from a preceding control value according to the setup regulation;
c) compare the checking value to the control value concurrently to the execution of the program; and
d) provide an indication to an interference with the execution of the specified execution path of the program when the checking value and the control value do not match,
wherein generating the control value, comparing the checking value to the control value and providing an indication are performed by hardware separate from the processor.

20. The non-transitory machine-readable carrier according to claim 19, wherein generating the control value comprises, in response to a preceding checking value, generating and storing in advance a control value to be compared to a subsequently received checking value.

21. The non-transitory machine-readable carrier according to claim 20, wherein generating the control value is performed using a shift register, a forward counter and a register for storing the control value,
wherein the comparator is configured to compare the control value stored in the register to the checking value upon receipt of a control signal, wherein the shift register is configured to delay the control signal, and wherein the forward counter is configured to receive the delayed control signal, to increase the control value and to write the increased control value into the register.

* * * * *